(12) United States Patent
Burbank et al.

(10) Patent No.: US 6,314,950 B1
(45) Date of Patent: Nov. 13, 2001

(54) INTAKE AIR TEMPERATURE CONTROL SYSTEM

(75) Inventors: Mark R. Burbank, Yuma, AZ (US); Eric D. Hardin, Bellevue, WA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/728,655

(22) Filed: Dec. 1, 2000

(51) Int. Cl.⁷ .................................................. B60H 3/00
(52) U.S. Cl. ............................................................. 123/542
(58) Field of Search ................................................ 123/542

(56) References Cited

U.S. PATENT DOCUMENTS

| 5,172,753 | * | 12/1992 | Kadle et al. | 123/542 |
| 5,910,099 | * | 6/1999 | Jordan, Jr. et al. | 123/41.31 |
| 6,169,953 | * | 1/2001 | Pano et al. | 12/41.12 |
| 6,216,458 | * | 4/2001 | Alger et al. | 123/568.12 |

* cited by examiner

Primary Examiner—Marguerite McMahon
(74) Attorney, Agent, or Firm—Larry G. Cain

(57) ABSTRACT

A vehicle operates under various ambient conditions and various operating parameters. To compensate for the ambient conditions and the operating parameters of an engine, a donor intake air temperature is controlled. An ambient air flow restriction system is used to vary the flow of a recipient ambient air through an air to air aftercooler. A plurality of louvers are operatively moved between a closed position and an open position. A controller interprets a respective signals from a plurality of sensors to define the position of the plurality of louvers.

19 Claims, 3 Drawing Sheets

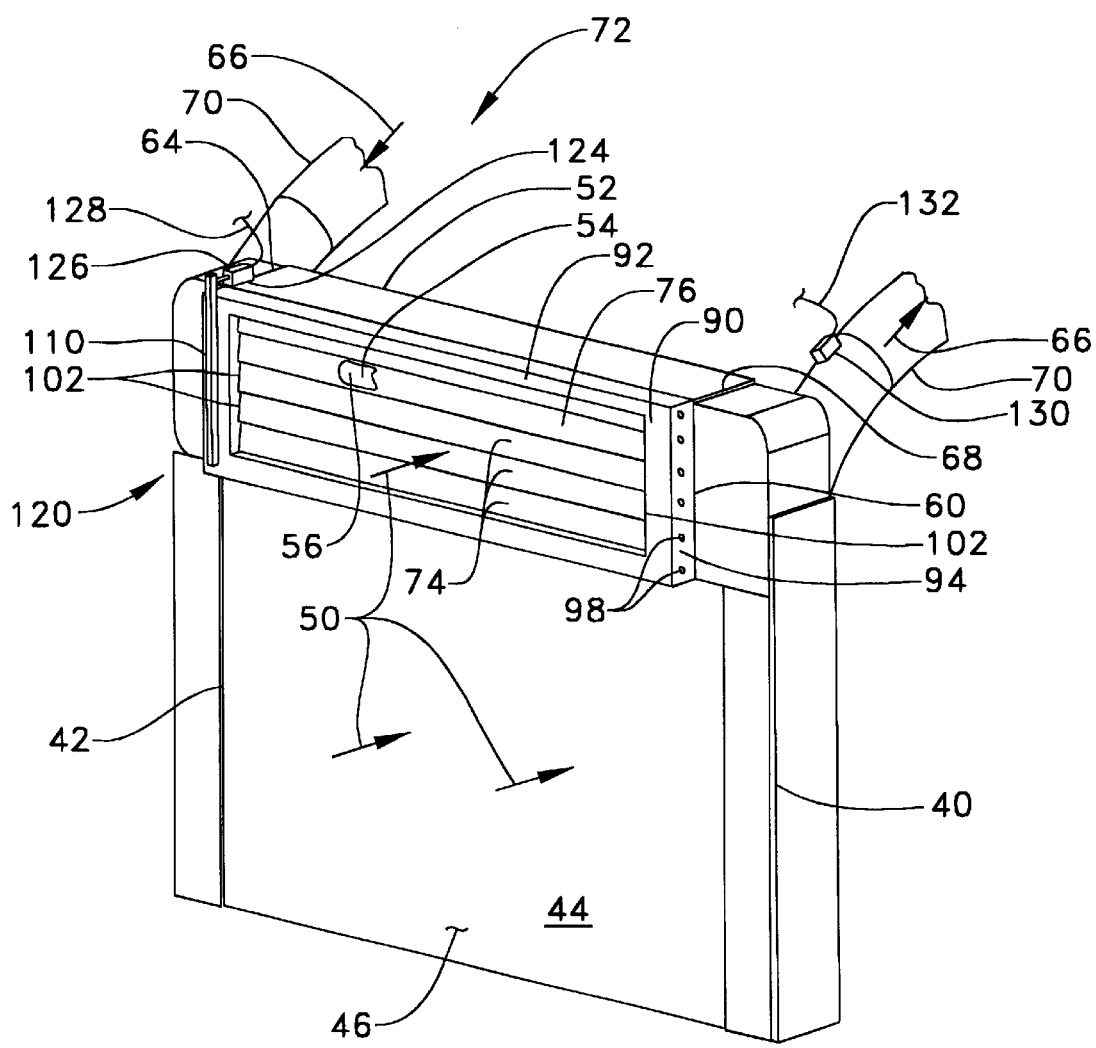

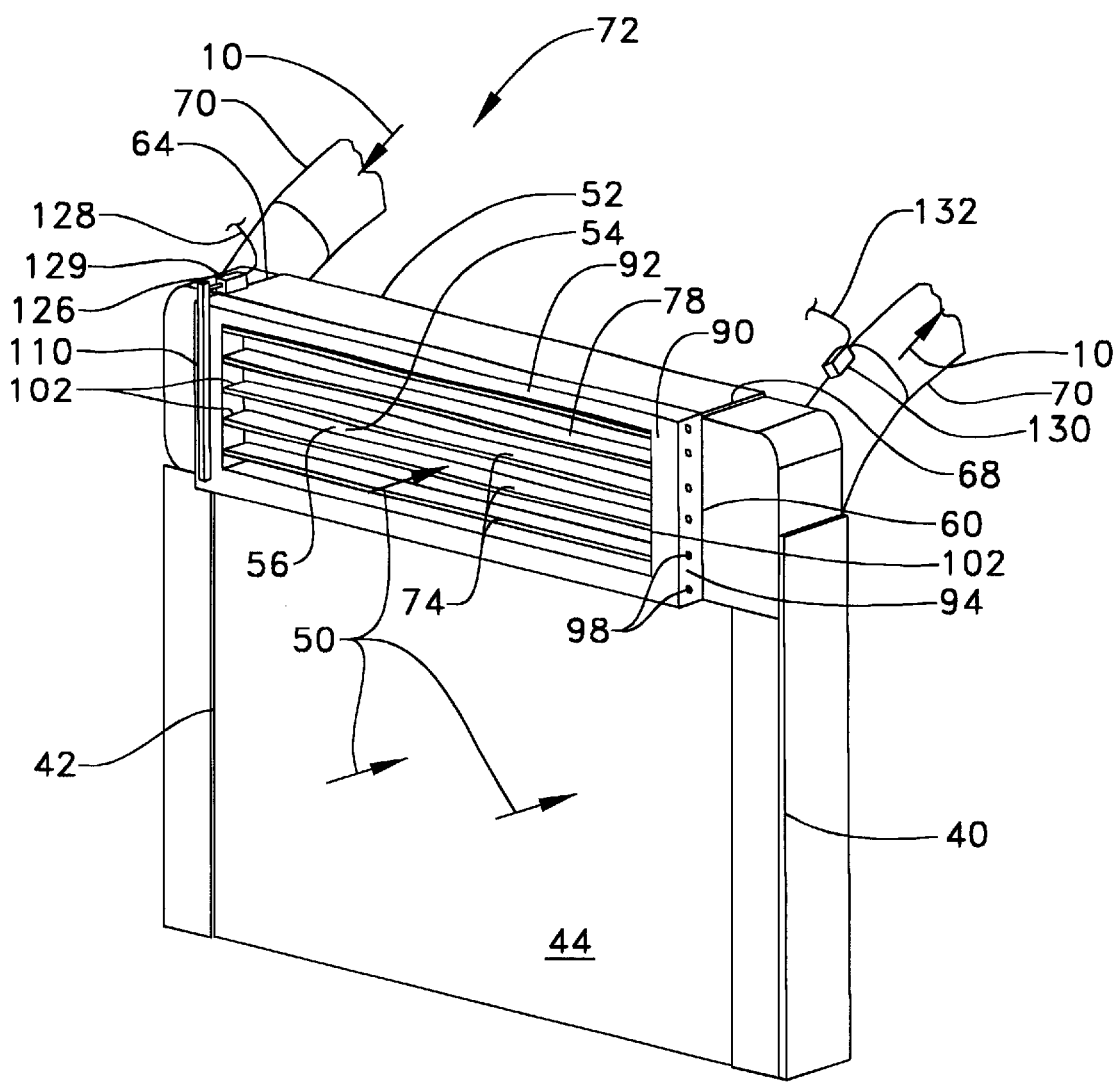
Fig_3_

INTAKE AIR TEMPERATURE CONTROL SYSTEM

TECHNICAL FIELD

This invention relates generally to an engine and more particularly to cooling intake air with an air to air aftercooler.

BACKGROUND ART

The use of turbocharged engines is a common practice. The turbocharger increases the quantity of air for combustion and increases the heat value or temperature of the intake air. To compensate for the increased temperature of the intake air, an aftercooler is used to reduce the temperature of the compressed intake air. Many of the cooling systems include a water jacket aftercooler. In the water jacket aftercooler a coolant from the engine is circulated through the aftercooler and the intake air is cooled. The use of engine coolant limits the temperature to which the intake air can be cooled. More recently, the cooling medium of the aftercooler has been converted to use ambient air and an air to air aftercooler has replaced the water jacket aftercooler. In some application and under some operating conditions, the air to air aftercooler reduces the temperature of the intake air too much. Since ambient air is used as the coolant or recipient fluid, the temperature of the ambient air varies depending on geographic location and season. Thus, the temperature of the intake air varies accordingly. Under these varying condition the combustion of the intake air and fuel results in varying characteristics. Under certain conditions the emissions therefrom can be increased due to the combustion temperature having the characteristic for forming excess Nox and other emissions. And, under other conditions, the structure of the engine can be damage due to excessive power being developed. Thus, a system for controlling the temperature of the intake air is needed.

The present invention is directed to overcome one or more of the problems as set forth above.

DISCLOSURE OF THE INVENTION

In one aspect of the invention, an engine has a flow of donor intake air entering an intake manifold. The flow of donor intake air passes through an aftercooler and has a preestablished temperature. The aftercooler is of an air to air configuration. The engine has a recipient ambient air flow passing through the aftercooler, a sensor determining a temperature of the recipient ambient air flow, a controller having a signal being transmitted from the sensor and the signal defining the temperature of the recipient ambient air flow, and a recipient ambient air flow restriction system defines a rate of flow of the recipient ambient air through the aftercooler.

In another aspect of the invention, a method of controlling a temperature of a donor intake air passing through an air to air aftercooler being cooled by a recipient ambient air flow is disclosed. The method has the following steps: sensing a temperature of the donor intake air; sensing the temperature of the recipient ambient air flow; comparing the temperature of the donor intake air against a fixed set of variables; comparing the temperature of the recipient ambient air flow against a fixed set of variables; and controlling a flow rate of the recipient ambient air flow through the air to air aftercooler.

In another aspect of the invention, a vehicle has an engine. The engine has a donor intake air being communicated to an intake manifold. The donor intake air passes through an aftercooler being of the air to air configuration and has a recipient ambient air flow passing through the aftercooler. The vehicle has a sensor determining a temperature of the recipient ambient air flow, a controller having a signal being transmitted from the sensor and the signal defining the temperature of the recipient ambient air flow, and a recipient ambient air flow restriction system defining a rate of flow of the recipient ambient air.

BRIEF DESCRIPTION OF THE DRAWINGS

FIG. 2 is an enlarged view of an air to air aftercooler embodying the present; and FIG. 3 is an enlarged view of the air to air aftercooler embodying the present.

BEST MODE FOR CARRYING OUT THE INVENTION

Figure 1:
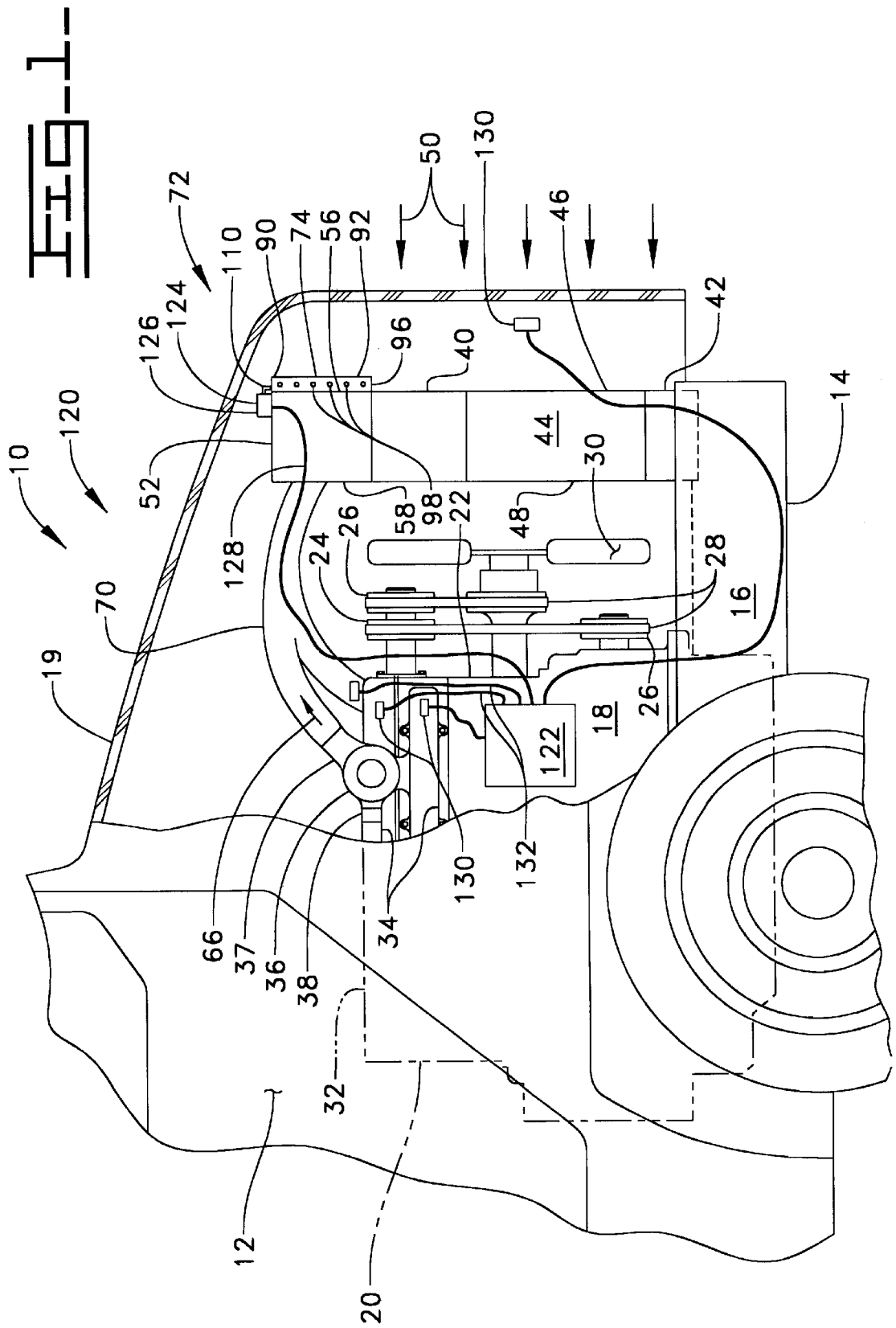
FIG. 1 is a side view of a vehicle embodying the present invention.

In FIG. 1 a vehicle 10 is shown. In this application, the vehicle 10 is an on highway tractor. However, as an alternative, the vehicle 10 could be any type of work machine, such as an off highway truck, scraper, wheel loader or track type machine. The vehicle 10 has a rear portion 12 and a front portion 14 being opposite one another. A frame 16 extends between the rear portion 12 and the front portion 14. Attached to the frame 16 and position in the vehicle 10 near the front portion 14 is an internal combustion engine 18. In this application, the internal combustion engine 18 is a compression ignition engine being water cooled; however, other types of internal combustion engines 18 can be used without changing the jest of the invention. The vehicle 10 has a hood 19 attached to the front portion 14 of the frame 16. The hood 19 has a preestablished configuration. The engine 18 has a rear portion 20 from which power is transferred to a drive train, not shown. And, the engine 18 has a front portion 22 having a drive train 24 of convention construction being a part thereof. The drive train 24 has a plurality of driven pulleys 26 attached thereto. A plurality of belts 28 operationally connect to the respective ones of the plurality of driven pulleys 26 and drive a plurality of accessories 30, such as an alternators, a fan or fans and a pump or pumps. The engine 18 has a plurality of cylinders, not shown, and an intake manifold 32 being in communication with the plurality of cylinders. The engine 18 has an exhaust system 34 connected thereto and in communication with the plurality of cylinders. A turbocharger 36 is connected to the engine 18 and communicates with the intake manifold 32 by way of a compressor section 37 and the exhaust system 34 by way of a turbine section 38 in a conventional manner.

As also shown in FIGS. 2 and 3, a radiator 40 is attached to the frame 16 in a conventional manner near the front portion 14 and is position under the hood 19. The radiator 40 has a frame 42 in which is positioned a core 44 having an air inlet side 46 and an air outlet side 48 positioned opposite one another. One of the plurality of accessories 30, the fan 30 is interposed the radiator 40 and the front portion 22 of the engine 18. In this application, the fan 30 is a sucker type configuration and creates a flow of recipient ambient air, designated by arrows 50. The fan 30 draws recipient ambient air from the inlet side 46 through the core 44 and out the outlet side 48.

An aftercooler 52 is positioned above the radiator 40. As an alternative, the aftercooler 52 can be placed upstream of the flow 50 through the radiator 40 near the air inlet side 46. As another alternative, the aftercooler 52 can be placed downstream of the flow 50 through the radiator 40 near the air outlet side 48. As a further alternative, the aftercooler 52 can be placed below the radiator 40. In this application, the aftercooler 52 has a core 54 having an ambient or recipient air inlet side 56 and an air outlet side 58. In the configuration shown in FIG. 2, the aftercooler 52 is a cross flow aftercooler configuration and has a frame 60 in which is positioned the core 54. The core 54 has an inlet end 64 through which a donor intake air, indicated by the arrows 66 enters. An outlet end 68 of the core 54 is positioned opposite the inlet end 64. The turbocharger 36 and a ducting system 70 of the engine 18 operatively causes the donor intake air 66 to enter the inlet end 64, pass through the core 54, exit the outlet end 68 and travel through another portion of the ducting system 70 to the intake manifold 32.

Attached to the ambient or recipient air inlet side 56 of the aftercooler 52 is an ambient air flow restriction system 72. The ambient air flow restriction system 72, in this application, uses a plurality of louvers 74 being movable between a closed position 76, shown in FIG. 2, and an open position 78, shown in FIG. 3. As an alternative, a flapper or guillotine device can be used without changing the essence of the invention. The restriction system 72 has a frame 90 having a pair of horizontal members 92 and a pair of vertical members 94 attached to form a box member 96 having a generally rectangular configuration. Each of the pair of vertical members 94 has a plurality of bores 98 therein. In this application, each of the plurality of bores 98 has a predetermined diameter and spacing therebetween. The restriction system 72 has the plurality of louvers 74 positioned within the box member 96. Each of the plurality of louvers 74 has an end portion 102 positioned within a respective one of the plurality of bores 98 of the vertical members 94. Each of the end portions 102 is configured to rotate within the respective one of the plurality of bores 98 as the respective one of the plurality of louvers 74 moves infinitely variably between the closed position 76 and the closed position 78. The restriction system 72 is positioned under the hood 19.

A linkage 110 is connected to the plurality of louvers 74 and a control system 120 operatively controls the position of the plurality of louvers 74 between the closed position 76 and the open position 78.

The control system 120 has a controller 122 which in this application is a part of the engine 18 configuration. However, as an alternative, the controller 122 can be a separate unit without changing the jist of the invention. An actuator 124 is in operative communication with the controller 122 and the linkage 110. For example, an electric solenoid 126 has a wire 128 communicating with the controller 122 and a signal having a varying magnitude is transmitted to the solenoid 126 through the wire 128. A plurality of sensors 130 are attached to the engine 18 in predetermined locations. For example, some of such predetermined locations are within the intake manifold 32 and within the exhaust system 34. Another portion of the plurality of sensors 130 are positioned within the flow of the recipient ambient air 50 and within the flow of donor intake air 66 before entering the inlet end 64 and after exiting the outlet end 68 of the aftercooler 52. A plurality of wires 132 are interposed the plurality of sensors 130 and the controller 122 and a signal is transmitted therethrough between the respective one of the plurality of sensors 130 and the controller 122.

INDUSTRIAL APPLICABILITY

In operation, the vehicle 10 is operating in an environment having a hot temperature, for example being consistently 90 degrees Fahrenheit or above. Under these conditions, the donor intake air 66 needs to be cooled to or near its maximum in order to provide maximum power output of the engine 18. Thus, the plurality of sensors 130 monitor operating conditions of the engine 18 and communicate the respective signals to the controller 122. The controller 122 stores, computes, and integrates the signals depending on a fixed set of variable. And, under the operating conditions of the environment, hot temperature, the actuator 124 maintains the plurality of louvers 74 in the open position 78. Thus, the maximum flow of ambient recipient air 50 passes through the core 54 of the aftercooler 52 and the donor intake air 66 is cooled to or near its maximum.

In another example, the vehicle 10 is operating in an environment having a cold temperature, for example being consistently 32 degrees Fahrenheit or below. Under these conditions, the donor intake air 66 needs to be prevented from being cooled in order to prevent structural damage to the engine 18, efficient operation of the engine 18 and prevent excess emissions. Thus, the plurality of sensors 130 monitor operating conditions of the engine 18 and communicate the respective signals to the controller 122. The controller 122 stores, computes, and integrates the signals depending on a fixed set of variable. And, under the operating conditions of the environment, cold temperature, maintains the plurality of louvers 74 in the closed position 76. Thus, the minimum flow of ambient recipient air 50 passes through the core 54 of the aftercooler 52 and the donor intake air 66 is prevented from being cooled.

If the vehicle 10 is operating in a environment which is not the hot nor is it the cold temperature, for example being consistently between 50 and 70 degrees Fahrenheit, the restriction system 72 must be operated with the plurality of louvers 74 between the closed position 76 and the open position 78. Under these conditions, the donor intake air 66 needs to be cooled but not to its maximum or to its minimum in order to provide maximum power output of the engine 18, control emissions from the engine 18 and efficiently operate the engine. Thus, the plurality of sensors 130 monitor operating conditions of the engine 18 and communicate the respective signals to the controller 122. The controller 122 stores, computes, and integrates the signals depending on a fixed set of variable. And, under the operating conditions of the environment, neither hot or cold temperature, maintains the plurality of louvers 74 in a position intermediate the closed position 76 and the open position 78. As the temperature of the environment changes, the position of the plurality of louvers 74 will also vary between the closed position 76 and the open position 78 accordingly. Thus, the appropriate flow of ambient recipient air 50 passes through the core 54 of the aftercooler 52 and the donor intake air 66 is cooled to its proper temperature to effectively operate the engine 18 under all ambient environmental conditions.

Thus, with the ambient air flow restriction system 72 the temperature of the donor intake air 66 can be monitored and controlled to a predetermined temperature. As the ambient temperature of the recipient ambient air 50 varies between hot and cold, the ambient air flow restriction system 72, specifically the plurality of louvers 74 controls the flow rate of recipient ambient air 50. Thus, if the donor intake air 66 needs to be cooler, the rate of flow of the recipient ambient air 50 is increased. And, similarly, if the donor intake air 66 needs to be warmer, the rate of flow of the recipient ambient air 50 is reduced.

Other aspects, objects and advantages of this invention can be obtained from a study of the drawings, the disclosure and the appended claims.

What is claimed is:

1. An engine having a flow of donor intake air entering an intake manifold, said flow of donor intake air passing through an aftercooler and having a preestablished temperature, said aftercooler being of an air to air configuration, said engine comprising:
   a recipient ambient air flow passing through said aftercooler;
   a sensor determining a temperature of said recipient ambient air flow;
   a controller having a signal being transmitted from said sensor and said signal defining said temperature of said recipient ambient air flow; and
   a recipient ambient air flow restriction system defining a rate of flow of said recipient ambient air through said aftercooler.

2. The engine of claim 1 wherein said recipient ambient air flow restriction system includes a plurality of louvers being movable between a closed position and an open position.

3. The engine of claim 2 wherein said temperature of said recipient ambient air flow being hot and said plurality of louvers being at said open position.

4. The engine of claim 2 wherein said temperature of said recipient ambient air flow being cold and said plurality of louvers being at said closed position.

5. The engine of claim 2 wherein said temperature of said recipient ambient air flow being neither hot and cold and said plurality of louvers being intermediate said closed position and said open position.

6. The engine of claim 2 wherein said plurality of louvers being infinitely movable between said closed position and said open position.

7. The engine of claim 1 wherein said controller being a part of said engine.

8. The engine of claim 1 wherein said recipient ambient air flow restriction system includes an actuator being connected to a linkage being connected to a plurality of louvers being operatively movable between a closed position and an open position.

9. The engine of claim 8 wherein said actuator being an electrical solenoid.

10. A method of controlling a temperature of a donor intake air passing through an air to air aftercooler being cooled by a recipient ambient air flow, said method comprising the following steps:
    sensing a temperature of said donor intake air;
    sensing the temperature of said recipient ambient air flow;
    comparing the temperature of said donor intake air against a fixed set of variables;
    comparing the temperature of said recipient ambient air flow against a fixed set of variables; and
    controlling a flow rate of said recipient ambient air flow through said air to air aftercooler.

11. The method of controlling the temperature of the donor intake air of claim 10 wherein said step of controlling the flow rate of said recipient ambient air flow includes reducing the rate of flow of said recipient ambient air flow through said aftercooler.

12. The method of controlling the temperature of the donor intake air of claim 11 wherein said step of comparing the temperature of said recipient ambient air flow against said fixed set of variables defines said temperature being cold.

13. The method of controlling the temperature of the donor intake air of claim 10 wherein said controlling the flow rate of said recipient ambient air flow includes increasing the rate of flow of said recipient ambient air flow through said aftercooler.

14. The method of controlling the temperature of the donor intake air of claim 13 wherein said step of comparing the temperature of said recipient ambient air flow against said fixed set of variables defines said temperature being hot.

15. The method of controlling the temperature of the donor intake air of claim 10 wherein said step of controlling the flow rate of said recipient ambient air flow includes a step of moving a plurality of louvers intermediate a closed position and an open position.

16. The method of controlling the temperature of the donor intake air of claim 15 wherein said step of moving said plurality of louvers intermediate said closed position and said open position including said movement therebetween being infinitely variable.

17. A vehicle having an engine, said engine having a donor intake air being communicated to an intake manifold, said donor intake air passing through an aftercooler being of an air to air configuration and having a recipient ambient air flow passing through said aftercooler, said vehicle comprising:
    a sensor determining a temperature of said recipient ambient air flow;
    a controller having a signal being transmitted from said sensor and said signal defining said temperature of said recipient ambient air flow; and
    a recipient ambient air flow restriction system defining a rate of flow of said recipient ambient air through said aftercooler.

18. The vehicle of claim 17 wherein said recipient ambient air flow restriction system includes a plurality of louvers being movable between a closed position and an open position.

19. The vehicle of claim 18 wherein said temperature of said recipient ambient air flow being hot and said plurality of louvers being at said open position and said temperature of said recipient ambient air flow being cold and said plurality of louvers being at said closed position.

* * * * *

UNITED STATES PATENT AND TRADEMARK OFFICE
CERTIFICATE OF CORRECTION

PATENT NO.   : 6,314,950 B1
DATED        : November 13, 2001
INVENTOR(S)  : Mark R. Burbank et al.

It is certified that error appears in the above-identified patent and that said Letters Patent is hereby corrected as shown below:

Title page,
Item [57], ABSTRACT,
Line 8, "signals" should be -- signal --.

Column 6,
Line 37, "determining" should be -- measuring --.

Signed and Sealed this

Twenty-first Day of January, 2003

JAMES E. ROGAN
*Director of the United States Patent and Trademark Office*